UNITED STATES PATENT OFFICE.

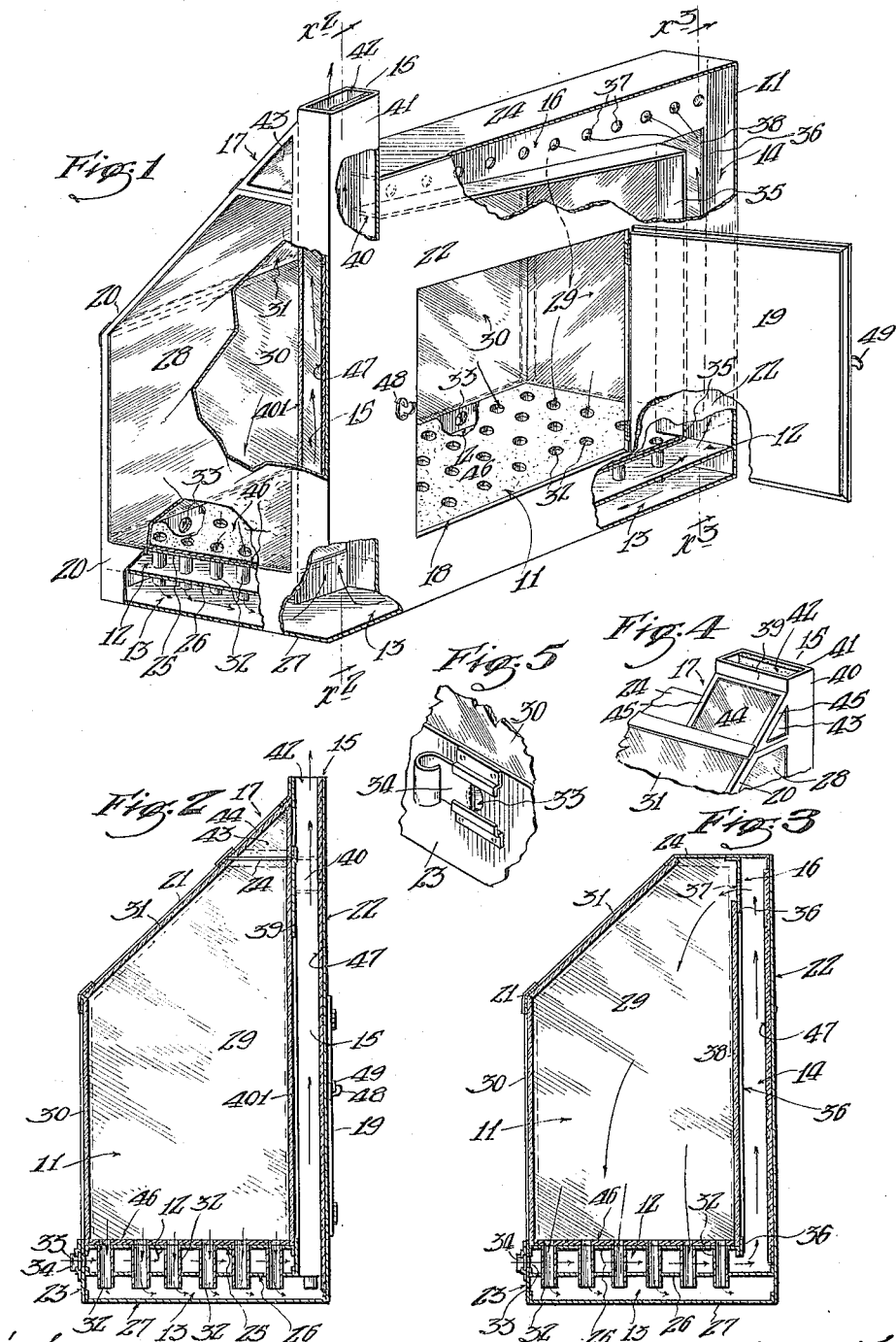

HARRY A. CHERRIER, OF REDLANDS, CALIFORNIA.

SOLAR COOKER.

1,158,175.

Specification of Letters Patent.

Patented Oct. 26, 1915.

Application filed February 15, 1915. Serial No. 8,335.

*To all whom it may concern:*

Be it known that I, HARRY A. CHERRIER, a citizen of the United States, residing at Redlands, in the county of San Bernardino, State of California, have invented a new and useful Solar Cooker, of which the following is a specification.

My invention relates to solar cookers, and the first object of the invention is to provide a solar cooker which will utilize the sun's rays for cooking purposes.

Dried fruits, vegetables, etc., can be readily prepared by subjecting them to a moderate temperature accompanied by a continuous circulation of dry hot air. Jellies, jams, etc., can also be made by a similar process, and jellies or jams so prepared have the natural flavor of the fruit, being much superior to similar jellies or jams which have been prepared by the ordinary cooking methods. To properly prepare such material it is necessary that the air supply be continuous, abundant, and hot so that the moisture in the material to be cooked is absorbed by the air and rapidly taken away.

The second object of the invention is to provide such a solar cooker in which the air is constantly circulated and in which the supply of fresh air may be regulated at will.

The third object of the invention is to introduce the fresh air at the top of the cooker in the hottest part of the cooker and to withdraw air from the bottom thereof at the coolest point.

The fourth object of the invention is to provide a preheater in which the incoming air is heated by the air which is being withdrawn.

The fifth object of the invention is to provide a distributer which will distribute the incoming fresh air along the top of the cooker.

The sixth object of the invention is to provide an accelerator for the purpose of increasing and controlling the natural draft of the cooker.

Further objects and advantages will be made evident hereinafter.

In the drawings which are for illustrative purposes only: Figure 1 is a perspective view of the cooker, certain of the parts being broken away to better illustrate the internal structure. Fig. 2 is a section through the cooker, on the center of the outlet flue, on the plane $x^2$—$x^2$ of Fig. 1. Fig. 3 is a section through the cooker, on the center of the inlet flue, on the plane $x^3$—$x^3$ of Fig. 1. Fig. 4 is a perspective view of the upper portion of the outlet flue and the accelerator which is located adjacent thereto. Fig. 5 is a perspective view of the slides which control the draft.

Broadly considered the cooker consists of a cooking chamber 11, a preheating chamber 12, a cooling chamber 13, an inlet flue 14, an outlet flue 15, a distributer 16, and an accelerator 17. An opening 18 provided with a door 19 gives access to the cooking chamber 11.

The cooker is constructed of metal ends 20 and 21, a metal back 22, a metal front 23, and a metal top 24, these parts being tightly connected together by soldering or other convenient means. A floor 25 and intermediate partition 26 are secured to the front, ends, and back of the cooker parallel to a bottom 27. Glass end panels 28 and 29 are tightly secured, preferably by means of putty, in the ends 20 and 21. A glass front 30 is similarly secured in the metal front 23 and a glass top 31 is similarly secured in the metal top 24 so that the chamber 11 is surrounded by glass on all sides but the back.

The chamber 12 is formed between the floor 25 and the partition 26, and the chamber 13 is formed between the partition 26 and the bottom 27, the chamber 13 being connected to the chamber 11 through a plurality of metal tubes 32 which are tightly secured in the floor 25 and the partition 26. A series of openings 33 which may be partially closed by slides 34 are cut in the metal front 23 in such a position as to allow the outer air to enter the preheating chamber 12. The inlet flue 14 which is formed of a metal member having a side 35 and a front 36 communicates with the preheating chamber 12 and forms an open communication between the chamber 12 and the distributer 16, the distributer being provided with a series of small holes 37 through which air enters the top of the chamber 11 from the distributer 16. The metal front 36 of the inlet flue 14 is cut away and covered with a glass member 38 so that the sun's rays have free access thereto. The outlet flue 15 is formed of a metal member bent to form a front 39 and a side 40, this metal member being cut away to receive a glass member 401 so that the sun's rays have free access to the interior of the outlet flue 15. The outlet flue communicates at its bottom with the cooling chamber 13 and extends up as shown at 41 some distance above the top 24 having an opening 42 through which air is discharged from the cooker into the outer air.

The accelerator 17 consists of glass sides 43 and a glass front 44 set in a metal frame 45, the accelerator being adjacent to the extension 41 on the outlet flue 15.

The floor 25 of the chamber 11 is covered with felt, or asbestos 46, and the back 22 is similarly covered as shown at 47. A hook 48 and latch 49 are provided so that the door 19 can be tightly closed, making the cooker practically air tight.

The method of operation is as follows: The cooker being so located that the sun's rays have free access to the interior thereof through the glass members 28, 29, 30, and 31, the sun's heat produces a circulation of air as follows: This circulation is largely produced and controlled by the action of the accelerator 17 which is an air tight chamber through which the sun's rays can enter and by means of which the extension 41 of the outlet flue 15 is superheated, this extension 41 and the superheater being made of sufficient size to provide a draft for circulating the air which moves as follows: The air enters through the opening 33, the amount thereof being controlled by the slides 34. The air then passes through the preheating chamber 12 coming in contact with the tubes 32 which are heated by the warm air passing downwardly therethrough. This air which is slightly heated then enters the inlet flue 14 being further heated therein and passing upwardly therethrough into the distributer 16 entering the chamber 11 through the holes 37. The air then passes downwardly through the chamber 11 and downwardly through the tubes 32 into the cooling chamber 13. The air is drawn out of the cooling chamber 13 by the draft produced in the extension 41 and in the outlet flue 15, this air passing upwardly and outwardly through the opening 42. It will be seen that it is possible to remove and insert the articles to be heated or cooked through the door 19 and that the chamber 11 is constantly supplied with air through the openings 37, this air being withdrawn through the tubes 32.

I claim as my invention:

1. A solar cooker comprising a cooking chamber formed of partially transparent walls through which the sun's rays can enter and an opaque back and floor, an inlet flue having openings at its upper end through which fresh air may be delivered to the top of said cooking chamber, an outlet flue for withdrawing air from the bottom of said cooking chamber, and an accelerator for heating the air in said outlet flue to increase the draft in said outlet flue.

2. A solar cooker comprising a cooking chamber formed of partially transparent walls through which the sun's rays can enter and an opaque back and floor, an inlet flue, a distributer connected to the top of said inlet flue and having openings therein through which fresh air is delivered to the top of said cooking chamber, an outlet flue for withdrawing air from the bottom of said cooking chamber, and an accelerator for heating the air in said outlet flue to increase the draft in said outlet flue.

3. A solar cooker comprising a cooking chamber formed of partially transparent walls through which the sun's rays can enter and an opaque back and floor, an inlet flue having openings at its upper end through which fresh air may be delivered to the top of said cooking chamber, an outlet flue for withdrawing air from the bottom of said cooking chamber, means by which the air from the bottom of said cooking chamber heats the air entering said inlet flue, and an accelerator for heating the air in said outlet flue to increase the draft in said outlet flue.

4. A solar cooker comprising inclosing walls, back, and bottom, a portion of the walls being transparent to admit the sun's rays to a cooking chamber, a floor for the cooking chamber placed parallel to and above the bottom of the cooker, a partition dividing the space between said floor and said bottom into an upper preheating chamber and a lower cooling chamber, means for connecting the cooling chamber with the cooking chamber, means for introducing fresh air into the preheating chamber, means for connecting the preheating chamber with the cooking chamber, and means for withdrawing air from the cooling chamber.

5. A solar cooker comprising inclosing walls, back, and bottom, a portion of the walls being transparent to admit the sun's rays to a cooking chamber, a floor for the cooking chamber placed parallel to and above the bottom of the cooker, a partition dividing the space between said floor and said bottom into an upper preheating chamber and a lower cooling chamber, a series of tubes secured in said floor and said partition and connecting said cooking and cooling chambers, means for introducing fresh air into the preheating chamber, means for connecting the preheating chamber with the cooking chamber, and means for withdrawing air from the cooling chamber.

6. A solar cooker comprising inclosing walls, back, and bottom, a portion of the walls being transparent to admit the sun's rays to a cooking chamber, a floor for the cooking chamber placed parallel to and above the bottom of the cooker, a partition dividing the space between said floor and said bottom into an upper preheating chamber and a lower cooling chamber, means for connecting the cooling chamber with the cooking chamber, means for introducing fresh air into the preheating chamber, an inlet flue having its lower end in open communication with said preheating chamber, a distributer in open communication with the upper end of said inlet flue, said distributer extending across and being provided with a series of openings through which fresh air is admitted to the top of said cooking chamber, and means for withdrawing air from the cooling chamber.

7. A solar cooker comprising inclosing walls, back, and bottom, a portion of the walls being transparent to admit the sun's rays to a cooking chamber, a floor for the cooking chamber placed parallel to and above the bottom of the cooker, a partition dividing the space between said floor and said bottom into an upper preheating chamber and a lower cooling chamber, a series of tubes secured in said floor and said partition and connecting said cooking and cooling chambers, means for introducing fresh air into the preheating chamber, an inlet flue having its lower end in open communication with said preheating chamber, a distributer in open communication with the upper end of said inlet flue, said distributer extending across the top of said cooking chamber and being provided with a series of openings through which fresh air is admitted to the top of said cooking chamber, and means for withdrawing air from the cooling chamber.

8. A solar cooker comprising inclosing walls, back, and bottom, a portion of the walls being transparent to admit the sun's rays to a cooking chamber, a floor for the cooking chamber placed parallel to and above the bottom of the cooker, a partition dividing the space between said floor and said bottom into an upper preheating chamber and a lower cooling chamber, means for connecting the cooling chamber with the cooking chamber, means for introducing fresh air into the preheating chamber, means for connecting the preheating chamber with the cooking chamber, and an outlet flue connected at its lower end to said cooling chamber and having its upper end in open communication with the outer air.

9. A solar cooker comprising inclosing walls, back, and bottom, a portion of the walls being transparent to admit the sun's rays to a cooking chamber, a floor for the cooking chamber placed parallel to and above the bottom of the cooker, a partition dividing the space between said floor and said bottom into an upper preheating chamber and a lower cooling chamber, a series of tubes secured in said floor and said partition and connecting said cooking and cooling chambers, means for introducing fresh air into the preheating chamber, means for connecting the preheating chamber with the cooking chamber, and an outlet flue connected at its lower end to said cooling chamber and having its upper end in open communication with the outer air.

10. A solar cooker comprising inclosing walls, back, and bottom, a portion of the walls being transparent to admit the sun's rays to a cooking chamber, a floor for the cooking chamber placed parallel to and above the bottom of the cooker, a partition dividing the space between said floor and said bottom into an upper preheating chamber and a lower cooling chamber, means for connecting the cooling chamber with the cooking chamber, means for introducing fresh air into the preheating chamber, an inlet flue having its lower end in open communication with said preheating chamber, a distributer in open communication with the upper end of said inlet flue, said distributer extending across and being provided with a series of openings through which fresh air is admitted to the top of said cooking chamber, and an outlet flue connected at its lower end to said cooling chamber and having its upper end in open communication with the outer air.

11. A solar cooker comprising inclosing walls, back, and bottom, a portion of the walls being transparent to admit the sun's rays to a cooking chamber, a floor for the cooking chamber placed parallel to and above the bottom of the cooker, a partition dividing the space between said floor and said bottom into an upper preheating chamber and a lower cooling chamber, a series of tubes secured in said floor and said partition and connecting said cooking and cooling chambers, means for introducing fresh air into the preheating chamber, an inlet flue having its lower end in open communication with said preheating chamber, a distributer in open communication with the upper end of said inlet flue, said distributer extending across the top of said cooking chamber and being provided with a series of openings through which fresh air is admitted to the top of said cooking chamber, and an outlet flue connected at its lower end to said cooling chamber and having its upper end in open communication with the outer air.

12. A solar cooker comprising inclosing walls, back, and bottom, a portion of the walls being transparent to admit the sun's rays to a cooking chamber, a floor for the cooking chamber placed parallel to and above the bottom of the cooker, a partition dividing the space between said floor and said bottom into an upper preheating chamber and a lower cooling chamber, means for connecting the cooling chamber with the cooking chamber, means for introducing fresh air into the preheating chamber, means for connecting the preheating chamber with the cooking chamber, an outlet flue connected at its lower end to said cooling chamber and having its upper end in open communication with the outer air, and an accelerator comprising a tight box with transparent walls so located that the sun's rays entering said accelerator heat the walls of said outlet flue and increase the draft therein.

13. A solar cooker comprising inclosing walls, back, and bottom, a portion of the walls being transparent to admit the sun's rays to a cooking chamber, a floor for the cooking chamber placed parallel to and above the bottom of the cooker, a partition dividing the space between said floor and said bottom into an upper preheating chamber and a lower cooling chamber, a series of tubes secured in said floor and said partition and connecting said cooking and cooling chambers, means for introducing fresh air into the preheating chamber, means for connecting the preheating chamber with the cooking chamber, an outlet flue connected at its lower end to said cooling chamber and having its upper end in open communication with the outer air, and an accelerator comprising a tight box with transparent walls so located that the sun's rays entering said accelerator heat the walls of said outlet flue and increase the draft therein.

14. A solar cooker comprising inclosing walls, back, and bottom, a portion of the walls being transparent to admit the sun's rays to a cooking chamber, a floor for the cooking chamber placed parallel to and above the bottom of the cooker, a partition dividing the space between said floor and said bottom into an upper preheating chamber and a lower cooling chamber, means for connecting the cooling chamber with the cooking chamber, means for introducing fresh air into the preheating chamber, an inlet flue having its lower end in open communication with said preheating chamber, a distributer in open communication with the upper end of said inlet flue, said distributer extending across and being provided with a series of openings through which fresh air is admitted to the top of said cooking chamber, an outlet flue connected at its lower end to said cooling chamber and having its upper end in open communication with the outer air, and an accelerator comprising a tight box with transparent walls so located that the sun's rays entering said accelerator heat the walls of said outlet flue and increase the draft therein.

15. A solar cooker comprising inclosing walls, back, and bottom, a portion of the walls being transparent to admit the sun's rays to a cooking chamber, a floor for the cooking chamber placed parallel to and above the bottom of the cooker, a partition dividing the space between said floor and said bottom into an upper preheating chamber and a lower cooling chamber, a series of tubes secured in said floor and said partition and connecting said cooking and cooling chambers, means for introducing fresh air into the preheating chamber, an inlet flue having its lower end in open communication with said preheating chamber, a distributer in open communication with the upper end of said inlet flue, said distributer extending across the top of said cooking chamber and being provided with a series of openings through which fresh air is admitted to the top of said cooking chamber, an outlet flue connected at its lower end to said cooling chamber and having its upper end in open communication with the outer air, and an accelerator comprising a tight box with transparent walls so located that the sun's rays entering said accelerator heat the walls of said outlet flue and increase the draft therein.

In testimony whereof, I have hereunto set my hand at San Bernardino, California, this 8th day of February, 1915.

HARRY A. CHERRIER.

In presence of—
J. W. ROBERTS,
W. HODDER.

Copies of this patent may be obtained for five cents each, by addressing the "Commissioner of Patents, Washington, D. C."